Feb. 25, 1930.　　A. WETTENKAMP　　1,748,592
WINDROWER FOR MOWING MACHINES
Filed Dec. 10, 1928　　2 Sheets-Sheet 1

Inventor
A. Wettenkamp

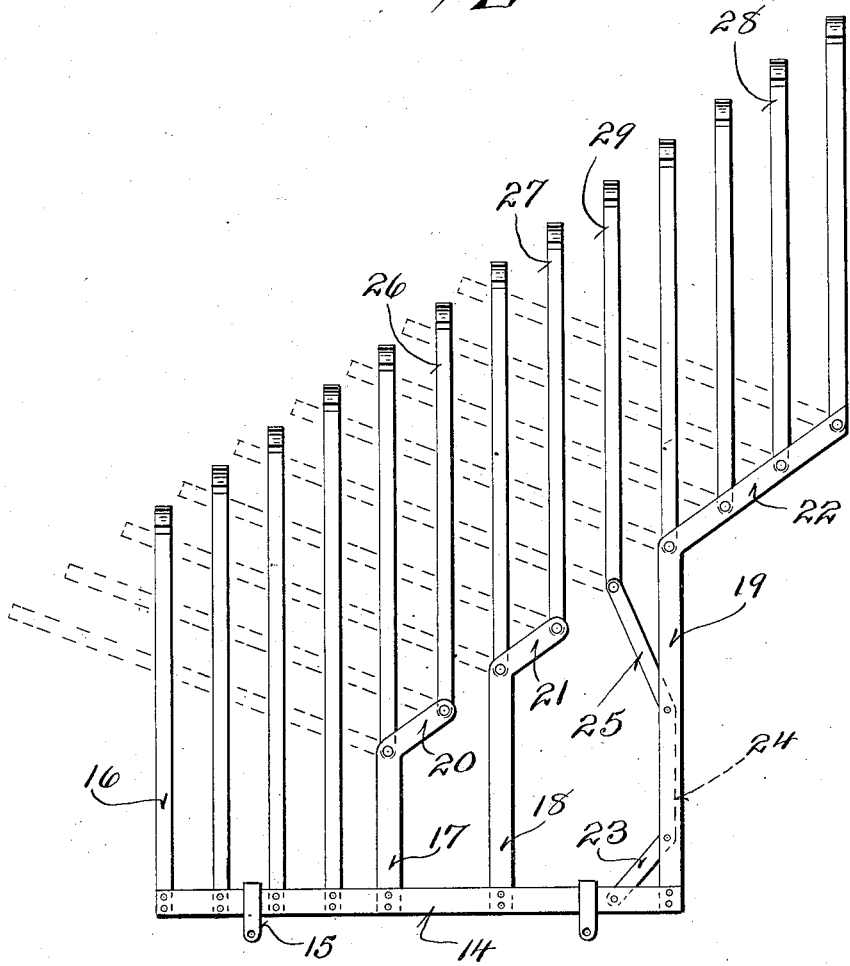

Patented Feb. 25, 1930

1,748,592

UNITED STATES PATENT OFFICE

ALBERT WETTENKAMP, OF MANITOWOC, WISCONSIN

WINDROWER FOR MOWING MACHINES

Application filed December 10, 1928. Serial No. 324,888.

This invention relates to a windrower for mowing machine.

Objects of this invention are to provide a novel form of windrower which will work with either a narrow or wide cutter bar of a mowing machine, and which will make a track wide enough for a horse-drawn or tractor-drawn mower, for harvesting clover, peas, or other crops into windrows at the rear of the mower.

Further objects are to provide a novel form of windrower which will bunch the material at the corners when the mower is turned, and which is so made that certain of the slats will swing beneath other of the slats and permit the free turning of the machine, while properly bunching the material, so that there is no wasting or scattering of the mowed material.

Further objects are to provide a construction of windrower in which the bars for carrying the pivoted slats, or swinging slats, are rearwardly slanting, so as to lessen the strain upon the bars in the event they strike an obstruction or projecting tuft of material, and which will act as a guide to slide the material laterally out of the way of these bars and thereby prevent breaking.

A further specific object of this invention is to provide a novel form of strengthening member, which is integrally made with one of the projecting, rearwardly slanting bars for the pivoted slats, so that this projecting bar and the strengthening member are rigidly held to the framework of the windrower.

Embodiments of this invention are shown in the accompanying drawings, in which:

Figure 3 is a plan view for a further form of windrower.

Figure 1:
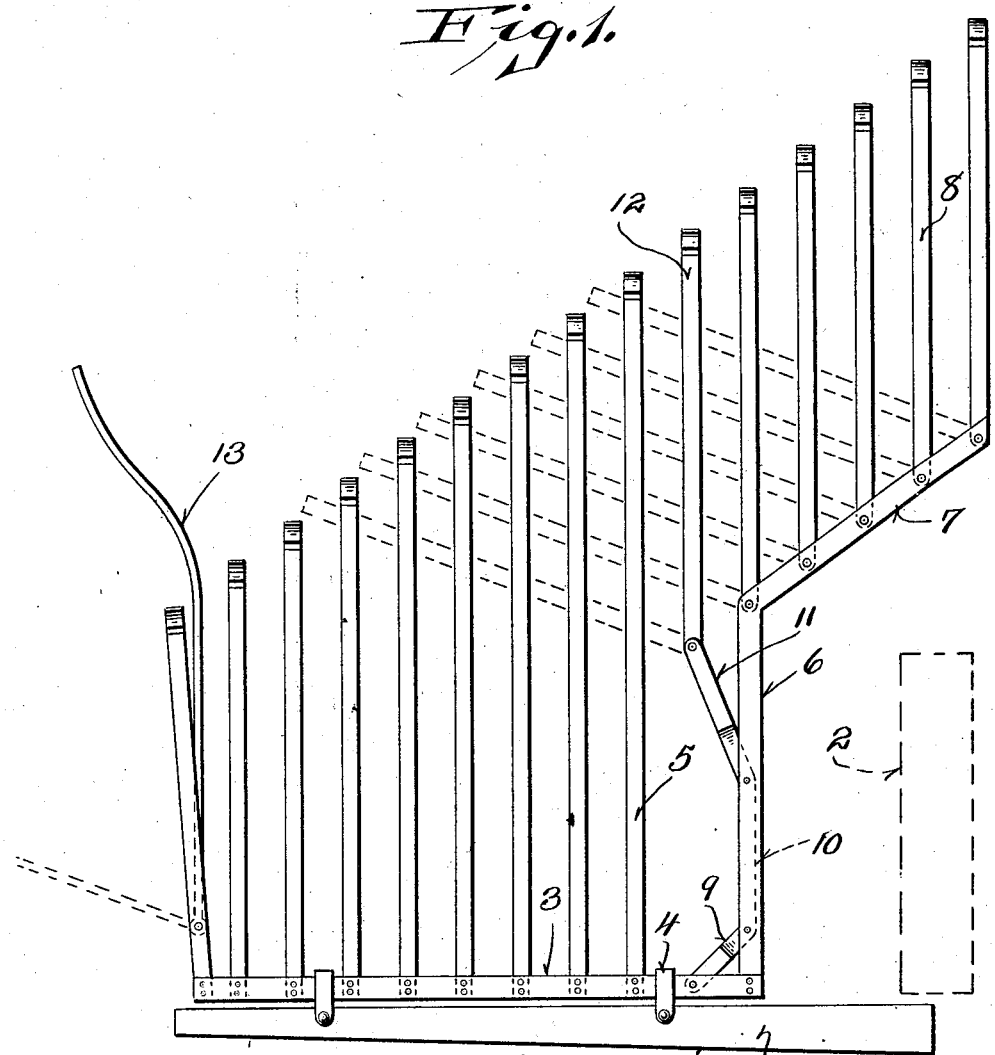
Figure 1 is a plan view of one form of the windrower.
Figure 2:
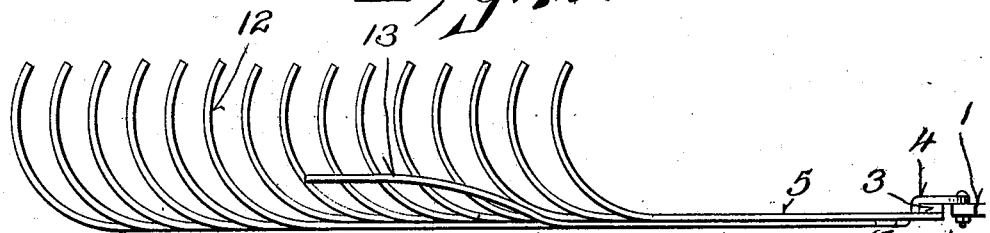
Figure 2 is a side view of the structure shown in Figure 1.

Referring to the drawings, it will be seen that in Figures 1 and 2 the usual finger bar of the mowing machine is indicated by the reference character 1, and the inner wheel is shown in dotted lines and indicated by the reference character 2. A main bar 3 is positioned rearwardly of the finger bar 1 and roughly parallels such bar. It is connected thereto by means of spaced clips 4.

It is to be noted that this bar 3 rigidly carries a plurality of rearwardly extending slats 5 which are of graduated length. A rearwardly projecting bar 6 is rigidly secured to the bar 3 and is, itself, provided with an extension 7 integral therewith for pivotally supporting the swinging slats 8.

It is to be noted, also, that a strengthening member 9 in the form of a strap is secured to the bar 3 and to the bar 6, adjacent their attached ends. The bar 9 has an integral, rearwardly extending portion 10 positioned below the bar 6, and also has an integral, rearwardly slanting portion 11 projecting outwardly from the bar 6. The portion 11 carries the swinging slat 12. All of the slats have upturned ends, and the swinging slats are of such length that their extreme rear ends align with the slanting line of the rear ends of the rigidly attached slats. A swinging curved divider bar 13 is pivoted to the outermost of the slats, as shown in Figure 1, and is employed to swing or push the uncut material at the edge of the swath over, out of the way, so that there is no waste or damage to the crop.

The slanting arrangement of the teeth insure the delivery of the material to one side of the windrower, so that the mowed material is discharged in an even windrow.

The slanting bars 7 and 11 will ride beneath the mowed material and will not catch on such material, thereby permitting the material to ride up on such bars and pass onto the slats.

It is to be noted, particularly, that the slats 8 and 12 are free to swing, so that when the mowing machine turns at the end of a swath, these pivoted slats will swing beneath the rigidly attached slats and permit proper bunching of the material, and also relieve the pivoted slats of excessive stresses which would otherwise be imposed thereon in this turning motion.

Further, it is apparent that the device may be attached to either a narrow or wide finger bar, or cutter bar.

The manner in which the strengthening member 9 is formed integral with the rearwardly slanting member 11, insures a very rigid bracing of the rearwardly extending bar 6 and also of the rearwardly slanting bars 7 and 11.

In the form of the invention shown in Figure 3, substantially the same inventive idea is followed. In this form of the invention, the main bar 14 is adapted for attachment to the finger bar by means of the clips 15, as previously described.

The bar 14 carries the rigidly attached slats 16 and also carries rigidly attached bars 17, 18 and 19, which extend directly rearwardly. These last three bars are provided with rearwardly slanting end bars 20, 21 and 22, which are integrally formed with the rearwardly extending, rigidly attached bars.

The same method of strengthening, or bracing, the rearwardly extending bar 19 is employed as that previously described. A slanting bar 23 is rigidly attached to the bars 14 and 19 and is integral with the rearwardly extending portion 24, and with the rearwardly and slanting projection portion 25. The bars 20, 21, 22 and 25 are all rearwardly slanting, rigidly carried members. These bars carry the swinging slats 26, 27, 28 and 29 respectively.

All of the slats are provided with upturned rear ends in both forms of the invention, and are of different lengths so as to secure the proper feeding and discharge of the mowed material, as the slats are dragged over the ground behind the mower.

Further, the rearwardly slanting portions, which carry the innermost of the swinging slats, are located behind the innermost wheel of the mower, and thus insure the catching of all of the mowed material.

Further, it is to be noted that the bars 10 and 24, as shown in Figures 1 and 3, are attached to the rearwardly extending bar in each case at spaced points, and thus a very rigid bracing or strengthening effect is produced.

In the last described form of the invention shown in Figure 3, the same facility in turning is afforded as in the first described form. The swinging, pivotally mounted slats readily permit the free turning of the mower at the end of each swath, and also insure the bunching of the material without wasting or without scattering such material.

It will be seen further that the windrower is so constructed that the minimum amount of strain is imposed thereon, although it is provided with a relatively long, overhanging portion directly rearwardly of the innermost wheel of a mowing machine.

It will also be noted that the device is comparatively simple and may be very cheaply constructed out of stock material, at a minimum expense.

Although the invention has been described in considerable detail, such description is intended as illustrative rather than limiting, as the invention may be variously embodied and as the scope of such invention is to be determined as claimed.

I claim:

1. A windrower attachment for a mowing machine having a finger bar, said attachment comprising a main bar, means for attaching said main bar to the finger bar of the mowing machine, a plurality of rearwardly extending slats rigidly attached to said main bar, a rearwardly extending bar rigid with said main bar and having a rearwardly and outwardly slanting portion, and a plurality of swinging slats pivotally attached to said slanting portion, said slats terminating in upturned rear ends which normally lie in a slanting line.

2. A windrower attachment for a mowing machine having a finger bar, said attachment having a main bar, means for attaching said main bar to the finger bar of the mowing machine, a rearwardly extending bar rigidly attached adjacent the innermost end of the main bar and having a rearwardly slanting portion, a plurality of swinging slats pivoted to said rearwardly slanting portion, a plurality of rearwardly extending slats rigidly attached to said main bar, a diagonal bracing bar secured to said main bar and having a portion secured to said rearwardly extending bar and terminating in a rearwardly and outwardly slanting portion, and a slat hinged to the end of the last mentioned portion.

3. A windrower attachment for mowing machines having a finger bar and a main bar secured thereto, a rearwardly extending bar rigidly attached adjacent the inner end of the main bar and having an obliquely disposed portion extending rearwardly and back of the mower wheel, a plurality of slats pivoted to the obliquely disposed portion, a plurality of rearwardly extended slats rigidly attached to the main bar, and auxiliary bars rigidly attached to the main bar, each having pairs of slats in pivotal union therewith, the auxiliary bars being positioned at the innermost end of the rearwardly extending bar.

In testimony that I claim the foregoing I have hereunto set my hand at Manitowoc, in the county of Manitowoc and State of Wisconsin.

ALBERT WETTENKAMP.